(12) United States Patent
Lee

(10) Patent No.: US 12,391,136 B2
(45) Date of Patent: Aug. 19, 2025

(54) MACROSCOPIC ALIGNMENT METHOD FOR WIRELESS CHARGING OF ELECTRIC VEHICLE AND APPARATUS AND SYSTEM THEREFOR

(71) Applicant: HYUNDAI MOBIS CO., LTD., Seoul (KR)

(72) Inventor: Jae Young Lee, Icheon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 626 days.

(21) Appl. No.: 17/863,583

(22) Filed: Jul. 13, 2022

(65) Prior Publication Data
US 2023/0202324 A1 Jun. 29, 2023

(30) Foreign Application Priority Data
Dec. 27, 2021 (KR) .......................... 10-2021-0188606

(51) Int. Cl.
| | | |
|---|---|---|
| B60L 53/38 | (2019.01) | |
| B60L 53/37 | (2019.01) | |
| G01S 17/08 | (2006.01) | |
| H02J 50/12 | (2016.01) | |
| H02J 50/90 | (2016.01) | |

(52) U.S. Cl.
CPC ............... *B60L 53/38* (2019.02); *B60L 53/37* (2019.02); *G01S 17/08* (2013.01); *H02J 50/12* (2016.02); *H02J 50/90* (2016.02)

(58) Field of Classification Search
CPC .... B60L 53/38; B60L 53/37; B60L 2240/622; B60L 53/32; B60L 53/36; B60L 53/12; B60L 53/126; B60L 53/66; B60L 2240/60; G01S 17/08; H02J 50/12; H02J 50/90; H02J 50/10; Y02T 10/70; Y02T 10/7072; Y02T 90/14; Y02T 90/12; Y02T 90/167; H04W 4/80; B60Y 2200/91
USPC .......................................................... 320/109
See application file for complete search history.

(56) References Cited

U.S. PATENT DOCUMENTS

| | | |
|---|---|---|
| 2019/0184841 A1 | 6/2019 | Van Wiemeersch et al. |
| 2020/0192362 A1 | 6/2020 | Murad et al. |
| 2020/0398689 A1 | 12/2020 | Lewis et al. |
| 2021/0237716 A1 | 8/2021 | Prasad et al. |
| 2021/0370788 A1 * | 12/2021 | Pantic ..................... H02J 50/90 |

FOREIGN PATENT DOCUMENTS

GB     2543093 A     4/2017

OTHER PUBLICATIONS

Extended European search report issued on Jan. 9, 2023, in counterpart European Patent Application No. 22183471.6 (9 pages in English).

* cited by examiner

*Primary Examiner* — Paul Dinh
(74) *Attorney, Agent, or Firm* — NSIP Law

(57) ABSTRACT

An alignment method for wireless charging of an electric vehicle includes identifying presence of a wireless power transmission pad during driving, estimating a distance to the wireless power transmission pad, performing a macroscopic alignment procedure according to the distance, and performing wireless charging based on the macroscopic alignment procedure being completed.

20 Claims, 8 Drawing Sheets

MACROSCOPIC ALIGNMENT METHOD FOR WIRELESS CHARGING OF ELECTRIC VEHICLE AND APPARATUS AND SYSTEM THEREFOR

CROSS-REFERENCE TO RELATED APPLICATION

This application claims the benefit of Korean Patent Application No. 10-2021-0188606, filed on Dec. 27, 2021, which is hereby incorporated by reference as if fully set forth herein.

BACKGROUND

Field of the Invention

The present disclosure relates to wireless charging technology for electric vehicles, and more particularly, to a technology for wireless charging of an electric vehicle by macroscopically aligning the electric vehicle equipped with a wireless power receiver for wireless charging with a wireless power transmitter installed in the center of a lane during driving of the vehicle.

Discussion of the Related Art

As the spread of electric vehicles is invigorated, interest in electric vehicle charging and demand for charging facilities are increasing. In the current electric vehicle charging system, electric vehicles are charged by connecting a dedicated charging plug provided at a separate charging station or in a house/parking lot to the electric vehicles.

However, charging an electric vehicle takes more time than a general refueling method, and there are difficulties in charging because sufficient charging stations have not been secured.

Accordingly, recently, interest in wireless charging of electric vehicles as an alternative to the existing charging stations is increasing.

According to the method of wireless charging of electric vehicles, when a vehicle equipped with a wireless charging reception pad is placed on a wireless power transmission pad buried in the ground and current is applied to the wireless power transmission pad, electric energy is transmitted to the wireless charging reception pad of the vehicle through electromagnetic induction or electromagnetic resonance to charge the battery provided in the vehicle.

The wireless electric vehicle charging method is not only friendly to the city landscape, but also has an advantage of requiring smaller space than the traditional plug-based charging method.

With a wireless power transmission pad installed before the stop line at the intersection to wirelessly charge an electric vehicle that stops and waits for a signal, the driver may not need to either much worry about the mileage or spend extra time to charge the electric vehicle.

The power transmission efficiency of the wireless charging system is determined by the degree of alignment of the wireless power transmission pad and the wireless power reception pad.

In general, in the case of wireless charging of a small electronic device such as a smartphone, the size of the wireless power transmission pad may be increased or a separate alignment means such as an electromagnet may be used to minimize the influence of the degree of alignment of the transmission and reception coils on the wireless charging efficiency.

However, in the case of an electric vehicle, the size of the wireless power transmission pad should be greatly increased, and accordingly a cost related issue may be raised and excessive power consumption may be caused.

In general, the wireless power reception pad of an electric vehicle is mounted on one side of a lower part of the vehicle, and thus it is difficult for a driver to visually align the wireless power transmission and reception pads during driving.

In addition, the location of the wireless power reception pad mounted on the electric vehicle may differ among vehicle manufacturers and among vehicle models. Accordingly, in order to increase the wireless charging efficiency, there is a need for a method for automatically aligning the wireless power transmission and reception pads before the vehicle approaches the wireless power transmission pad during driving.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An object of the present disclosure is to provide a method for automatically aligning an electric vehicle equipped with a wireless power receiver with a wireless power transmitter for wireless charging during driving, and an apparatus and system for the same.

Another object of the present disclosure is to provide a wireless charging method for an electric vehicle capable of automatically performing longitudinal and lateral alignment by adaptively using various sensors provided in the electric vehicle according to the distance to a wireless power transmission pad, and an apparatus and system for the same.

Another object of the present disclosure is to provide a wireless charging method for an electric vehicle capable of minimizing power waste and user inconvenience by automatically and optimally aligning wireless power transmission/reception pads during driving of the electric vehicle, and an apparatus and system for the same.

It will be appreciated by persons skilled in the art that the objects that could be achieved with the present disclosure are not limited to what has been particularly described hereinabove and the above and other objects that the present disclosure could achieve will be more clearly understood from the following detailed description.

In one general aspect, an alignment method for wireless charging of an electric vehicle includes identifying presence of a wireless power transmission pad during driving, estimating a distance to the wireless power transmission pad, performing a macroscopic alignment procedure according to the distance, and performing wireless charging based on the macroscopic alignment procedure being completed.

Location information related to the wireless power transmission pad may be pre-registered and maintained in a navigation system, and the presence of the wireless power transmission pad may be identified based on the location information provided by the navigation system.

Estimating the distance to the wireless power transmission pad may include driving a Light Detection and Ranging (LiDAR) and a front camera disposed in the electric vehicle based on the presence of the wireless power transmission pad in a driving lane in front of the electric vehicle, determining whether an object detected by the LiDAR and undetected by the front camera is present, and estimating a longitudinal distance to the wireless power transmission pad based on one of the information provided by the navigation system or information from the LiDAR.

Based on the object detected by the LiDAR and undetected by the front camera being present, the longitudinal distance may be estimated based on the information from the LiDAR, and, based on the object detected by the LiDAR and undetected by the front camera not being present, the longitudinal distance may be estimated based on global positioning system (GPS) information about the electric vehicle and the wireless power transmission pad.

The GPS information about the wireless power transmission pad may be pre-registered and maintained in the navigation system, and, based on the electric vehicle being positioned within a specific distance from the wireless power transmission pad in front of the electric vehicle, the GPS information about the electric vehicle and the wireless power transmission pad may be provided by the navigation system.

The macroscopic alignment procedure may include performing lateral control, and performing longitudinal control based on completion of the lateral control.

Performing the lateral control may include based on the distance to the wireless power transmission pad being within a first distance, performing lateral position control such that a center line of a driving lane identified based on an image from a side-view camera is positioned on a same line as an offset extension line of a wireless power reception pad mounted on the electric vehicle, and based on the distance to the wireless power transmission pad being within a second distance, performing fine lateral control such that a center line of the wireless power transmission pad recognized based on an image from a surround view monitor (SVM) camera is positioned on the same line as the offset extension line of the wireless power reception pad, and the first distance may be larger than the second distance.

Performing the longitudinal control may include based on the distance to the wireless power transmission pad being within a third distance, making a request for transmission of a first wireless power to a supply device corresponding to the wireless power transmission pad, receiving the first wireless power via the wireless power reception pad, and performing fine longitudinal control based on the first wireless power.

Performing the fine longitudinal control may include decelerating driving, measuring an amount of induced power corresponding to the first wireless power during the decelerated driving, detecting an inflection point of the amount of the induced power, and stopping the electric vehicle at a point where the inflection point is detected.

Performing the wireless charging may include based on the fine longitudinal control being completed, making a request for transmission of a second wireless power to the supply device, receiving the second wireless power via the wireless power reception pad, and charging a battery using the second wireless power.

A magnitude of the second wireless power may be greater than a magnitude of the first wireless power, the first wireless power may be requested through Vehicle to Everything (V2X) communication, and the second wireless power may be requested through in-band communication or short-range wireless communication.

Performing the fine longitudinal control may include decelerating driving, calculating a wireless charging efficiency corresponding to the first wireless power during the decelerated driving, detecting a time at which the wireless charging efficiency exceeds a reference value, and stopping the electric vehicle at the time at which the wireless charging efficiency exceeds the reference value.

Performing the fine longitudinal control may include decelerating driving, measuring a beam pattern corresponding to the first wireless power during the decelerated driving, determining a stop time point by comparing the measured beam pattern with an optimal beam pattern, and stopping the vehicle according to the stop time point.

In another general aspect, a non-volatile computer-readable storage medium storing at least one computer program including instructions that, when executed by at least one processor, cause an electric vehicle provided with the at least one processor to perform alignment operations for wireless charging. The operations include identifying presence of a wireless power transmission pad during driving, estimating a distance to the wireless power transmission pad, performing a macroscopic alignment procedure according to the distance, and performing wireless charging based on the macroscopic alignment procedure being completed.

In another general aspect, an electric vehicle equipped with a wireless charging function includes a vehicle terminal configured to communicate with an external device, a vehicle sensor configured to provide at least one piece of sensing information necessary for alignment of a wireless power transmission pad and a wireless power reception pad, and an electrically powered device configured to operate in conjunction with the vehicle terminal and the vehicle sensor to identify presence of the wireless power transmission pad during driving, estimate a distance to the wireless power transmission pad, perform a macroscopic alignment procedure according to the distance, and perform wireless charging based on the macroscopic alignment procedure being completed.

In an embodiment, the vehicle terminal may provide information of a navigation system, wherein location information about the wireless power transmission pad may be pre-registered in the navigation system, wherein the presence or absence of the wireless powered transmission pad may be identified based on information provided by the navigation system.

In an embodiment, the vehicle sensor may include a Light Detection and Ranging (LiDAR) and a front camera, wherein the electrically powered device may be configured to drive the LiDAR and the front camera based on the presence of the wireless power transmission pad in a driving lane in front of the vehicle, and determine whether an object detected by the LiDAR and undetected by the front camera is present, and estimate a longitudinal distance to the wireless power transmission pad based on one of the information provided by the navigation system or information from the LiDAR according to a result of the determination.

In an embodiment, based on the object detected by the LiDAR and undetected by the front camera being present, the electrically powered device may estimate the longitudinal distance based on the information from the LiDAR, wherein, based on the object detected by the LiDAR and undetected by the front camera not being present, the electrically powered device may estimate the longitudinal distance based on global positioning system (GPS) information about the electric vehicle and the wireless power transmission pad included in the information provided by the navigation system.

In an embodiment, the GPS information about the wireless power transmission pad may be pre-registered and maintained in the navigation system, wherein, based on the electric vehicle being positioned within a specific distance from the wireless power transmission pad in front of the vehicle, the GPS information about the electric vehicle and the wireless power transmission pad may be provided by the navigation system.

In an embodiment, the macroscopic alignment procedure may include lateral control, and longitudinal control performed based on the lateral control being completed.

In an embodiment, the vehicle sensor may include a side-view camera and a surround view monitor (SVM) camera, wherein the lateral control may be performed using the side-view camera and the SVM camera, wherein the electrically powered device may be configured to: based on the estimated distance being within a first distance, perform lateral position control such that a center line of a driving lane identified based on an image from a side-view camera is positioned on the same line as an offset extension line of the wireless power reception pad mounted on the electric vehicle; and based on the estimated distance being within a second distance, perform fine lateral control such that a center line of the wireless power transmission pad recognized based on an image from the SVM camera is positioned on the same line as the offset extension line of the wireless power reception pad.

In an embodiment, the longitudinal control performed by the electrically powered device may include based on the estimated distance being within a third distance, making a request for transmission of a first wireless power to a supply device corresponding to the wireless power transmission pad, receiving the first wireless power via the wireless power reception pad, and performing fine longitudinal control based on the received first wireless power.

In an embodiment, the fine longitudinal control may include measuring an amount of induced power corresponding to the first wireless power during decelerated driving, detecting an inflection point of the amount of the induced power, and stopping the vehicle at a point where the inflection point is detected.

In an embodiment, the electrically powered device may be configured to: based on the fine longitudinal control being completed, make a request for transmission of a second wireless power to the supply device; receive the second wireless power via the wireless power reception pad; and charge a provided battery using the received second wireless power.

In an embodiment, a magnitude of the second wireless power may be greater than a magnitude of the first wireless power, wherein the first wireless power may be requested through Vehicle to Everything (V2X) communication, and the second wireless power may be requested through in-band communication or short-range wireless communication.

In an embodiment, the fine longitudinal control may include calculating a wireless charging efficiency corresponding to the first wireless power during decelerated driving, detecting a time when the calculated wireless charging efficiency exceeds a predetermined reference value, and stopping the vehicle at the detected time.

In an embodiment, the performing of the fine longitudinal control may include measuring a beam pattern corresponding to the first wireless power during decelerated driving, determining a stop time point by comparing the measured beam pattern with a preset optimal beam pattern, and stopping the vehicle according to the determined time.

In another aspect of the present disclosure, a wireless charging system may include a supply device configured to supply wireless power via a wireless power transmission pad, and an electric vehicle including a vehicle terminal configured to communicate with an external device, a vehicle sensor configured to provide at least one piece of sensing information necessary for alignment of a wireless power transmission pad and a wireless power reception pad, and an electrically powered device configured to operate in conjunction with the vehicle terminal and the vehicle sensor to identify presence or absence of the wireless power transmission pad during driving, estimate a distance to the identified wireless power transmission pad, perform a macroscopic alignment procedure according to the estimated distance, and perform wireless charging based on the macroscopic alignment procedure being completed.

The above-described aspects of the present disclosure are merely some of the preferred embodiments of the present disclosure, and various embodiments reflecting the technical features of the present disclosure may be derived and understood by those skilled in the art based on the following detailed description of the disclosure.

According to the present disclosure, a method for automatically aligning an electric vehicle equipped with a wireless power receiver with a wireless power transmitter for wireless charging during driving, and an apparatus and system for the same may be provided.

In addition, the present disclosure may provide a wireless charging method for an electric vehicle capable of automatically performing longitudinal and lateral alignment by adaptively using various sensors provided in the electric vehicle according to the distance to a wireless power transmission pad, and an apparatus and system for the same.

In addition, according to the present disclosure, wireless charging efficiency may be maximized by automatically and optimally aligning wireless power transmission and reception pads during driving of an electric vehicle. Thereby, unnecessary power waste and user inconvenience may be minimized.

In addition, according to the present disclosure, the driving distance of an electric vehicle may be improved by performing wireless charging during driving.

In addition, according to the present disclosure, the wireless power transmission and reception pads may be pre-aligned before an electric vehicle temporarily stops. Thereby, wireless charging may be performed more effectively during a temporary stop at an intersection or the like.

In addition, various effects that can be directly or indirectly identified through this document may be provided.

Other features and aspects will be apparent from the following detailed description, the drawings, and the claims.

BRIEF DESCRIPTION OF THE DRAWINGS

The accompanying drawings, which are included to provide a further understanding of the disclosure, provide various embodiments of the present disclosure and illustrate principles of the present disclosure together with detail explanation.

DETAILED DESCRIPTION

Figure 1:
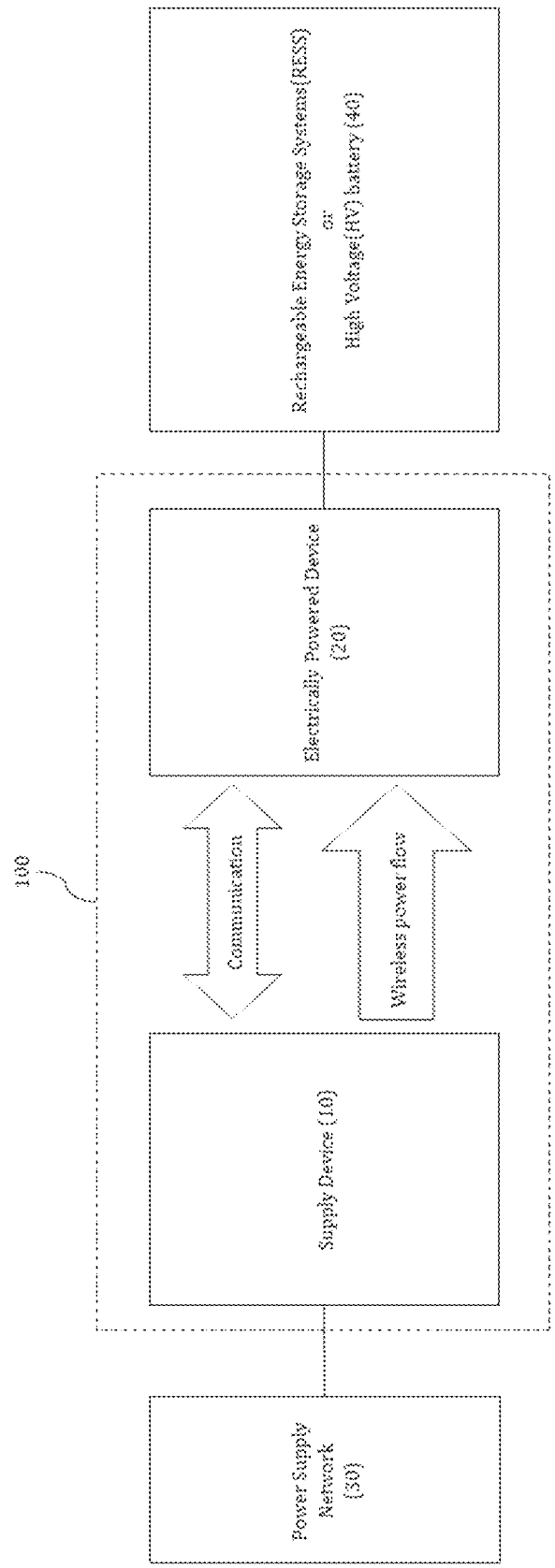
FIG. 1 is a diagram illustrating the overall structure of a wireless power transmission system according to an embodiment.

Hereinafter, some embodiments of the present disclosure will be described in detail with reference to the accompanying drawings. It should be noted that, in adding reference numerals to the constituent elements in the respective drawings, like reference numerals will be used throughout the drawings to refer to the same or like elements. Further, in the following description of embodiments of the present disclosure, a detailed description of known functions and configurations incorporated herein will be omitted to avoid obscuring the subject matter of the embodiments.

In describing the components of the embodiments of the present disclosure, various terms such as first, second, A, B, (a), (b), etc., may be used solely for the purpose of differentiating one component from another, but the essence, order or sequence of the components are not limited to these terms. Unless defined otherwise, all terms, including technical and scientific terms, used in the present disclosure may have the same meaning as commonly understood by a person having ordinary skill in the art to which the present disclosure pertains. It will be further understood that terms, such as those defined in commonly used dictionaries, may be interpreted as having a meaning that is consistent with their meaning in the context of the related art and the present disclosure, and may not be interpreted in an idealized or overly formal sense unless expressly so defined herein.

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Hereinafter, embodiments of the present disclosure will be described in detail with reference to FIGS. 1 to 8.

FIG. 1 is a diagram illustrating the overall structure of a wireless power transmission system according to an embodiment.

Referring to FIG. 1, a wireless power transmission system 100 may include a supply device 10 and an electrically powered device 20.

The supply device 10 may convert AC (or DC) electrical energy supplied from a power supply network 30 into AC electrical energy required by the electrically powered device 20, and then transmit the converted AC electrical energy to the electrically powered device 20 using a predetermined wireless energy transmission method. Here, the wireless energy transmission method may include electromagnetic induction, electromagnetic resonance (or magnetic resonance), microwaves, and radio frequency (RF) wireless power transmission. The electromagnetic induction is a method of transferring energy using an induced electromotive force generated by a magnetic induction of AC power between the primary coil provided in the supply device 10 and the secondary coil provided in the electrically powered device 20. On the other hand, in the method of electromagnetic resonance, when a magnetic field that vibrates at a specific resonant frequency is generated through the primary coil provided in the supply device 10, the electrically powered device 20 induces a magnetic field in the secondary coil having the same resonant frequency to transfer energy. The RF wireless power transmission is a method of transmitting an RF wireless power signal to the receiver through beamforming using a phased array antenna system of the transmitter. This method may allow remote wireless charging up to a radius of several meters, compared to the conventional electromagnetic induction or electromagnetic resonance.

The supply device 10 and the electrically powered device 20 may be interconnected through short-range wireless communication to exchange various kinds of information for wireless power transmission.

The electrically powered device 20 may rectify the wireless power received from the supply device 10 and then supply the rectified power to the in-device—that is, on-board—rechargeable energy storage systems (RESS) or high voltage (HV) battery.

The supply device 10 according to the embodiment may be installed in a building, a road, a parking lot, a charging hub, or a vertiport, which is infrastructure for takeoff and landing of urban air mobility located on land, in the air, on water or on the roof of a building. When a wireless power transmission pad for wireless power transmission is mounted on the electrically powered device 20, the electrically powered device 20 may perform a function as a supply device. Thereby, wireless charging may be performed between the electrically powered devices 20.

For example, when the electrically powered device 20 is equipped with multiple wireless power reception pads, the electrically powered device 20 may receive wireless power from other multiple electrically powered devices 20 equipped with a wireless power transmission pad at the same time to charge the battery.

As another example, when the electrically powered device 20 is equipped with multiple wireless power transmission pads, the electrically powered device 20 may transmit wireless power to other multiple electrically powered devices 20 equipped with a wireless power reception pad to charge the multiple electrically powered devices 20 at the same time. That is, when the electrically powered device 20 is unable to move to the supply device 10 due to the current battery charge amount, it may be operatively connected to another nearby electrically powered device 20 to perform charging between the electrically powered devices 20. As an example, an electrically powered device to supply wireless power and an electrically powered device to receive the wireless power may be dynamically determined based on the current battery charge amount of the electrically powered device 20.

The electrically powered device 20 according to the embodiment may be mounted on various means of transportation. As an example, the electrically powered device 20 may be applied to an electric vehicle, an unmanned drone, urban air mobility, multi-modal mobility (or hybrid air mobility) operating on land and in the air or on land and at sea.

The electrically powered device 20 according to the embodiment may be mounted on one side of a lower part of the vehicle. However, this is merely one embodiment. The electrically powered device may be mounted on one side of the front/rear bumper of the vehicle, one side of the left/right side mirror of the vehicle, or one side of an upper part of the vehicle according to the design by those skilled in the art.

The supply device 10 according to the embodiment may be operatively connected to other supply devices by a wired or wireless communication system.

The electrically powered device 20 according to the embodiment may be operatively connected to an electrically powered device (not shown) mounted on another vehicle by a wireless communication system. To this end, the electrically powered device 20 may be connected to a vehicle terminal (not shown) over an in-vehicle communication network. For example, the wireless communication system may be a multiple access system that supports communication with multiple users by sharing an available system resource (e.g., bandwidth, transmit power, etc.). Examples of the multiple access system may include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

The electrically powered device 20 according to the embodiment may be connected to another supply device by wireless communication. As an example, the electrically powered device 20 may be connected to multiple supply devices 10. In this case, the electrically powered device 20 may receive wireless power from the supply devices 10 simultaneously. Based on the wireless charging efficiency between the electrically powered device 20 and the supply devices 10, the electrically powered device 20 may dynamically determine at least one supply device 10 to receive power.

In the above-described embodiment, it has been described that the supply device 10 and the electrically powered device 20 to perform wireless charging are dynamically determined based on the wireless charging efficiency. However, this is merely one embodiment. The supply device 10 and the electrically powered device 20 to perform wireless charging may be dynamically determined by further considering the type and capability of the supply device 10, the type and capability of the electrically powered device 20, and the like. As an example, the type and capability of the electrically powered device 20 may depend on the type of the transportation means on which the electrically powered device 20 is mounted. Accordingly, the type and capability of the supply device 10 matching the electrically powered device 20 may depend on the electrically powered device 20.

The electrically powered device 20 according to the embodiment may serve as a power relay to transmit power received from the supply device 10 to an electrically powered device of another vehicle. In this case, the electrically powered device 20 may include both a wireless power receiver configured to receive wireless power and a wireless power transmitter configured to transmit wireless power. The wireless power receiver and the wireless power transmitter may be mounted at positions in the vehicle, but this is merely an example. The wireless power receiver and wireless power transmitter may be configured as one module and mounted at the same position. As an example, a wireless power receiver to receive power from the supply device 10 may be disposed on one side of the lower part of the vehicle, and a wireless power receiver to receive power from a wireless power transmitter of another vehicle may be disposed at the center of the front bumper of the vehicle. Also, a wireless power transmitter to wirelessly transmit power to another vehicle may be disposed at the center of the rear bumper of the vehicle. As another example, an integrated module implemented to enable wireless power transmission and reception (hereinafter, referred to as an "integrated transceiver" for simplicity) may be disposed on one side of a side mirror of the vehicle, and a wireless power receiver to receive power from the supply device 10 may be disposed on one side of the lower part (or upper part) of the vehicle. As another example, a wireless power receiver to receive power from the supply device 10 may be disposed on one side of the lower part (or upper part) of the vehicle, and a wireless power receiver to receive power from another vehicle in front of the vehicle may be disposed at the center of the front bumper of the vehicle. Also, a wireless power transmitter to transmit power to another vehicle behind the vehicle may be disposed at the center of the rear bumper of the vehicle, and an integrated transceiver may be disposed on one side of the left/right side mirror of the vehicle.

According to the above-described embodiments, a vehicle equipped with the electrically powered device 20 according to the present disclosure may be implemented to flexibly configure a longitudinal and/or lateral wireless charging chain.

The electrically powered device 20 may control at least one switch corresponding to the wireless power transmitter and the wireless power receiver to turn on/off the operations of the wireless power transmitter and the wireless power receiver.

As an example, an electrically powered device of a first vehicle may be operatively connected to an electrically powered device provided in the second vehicle to divide wireless power received from the supply device and transmit the same to the battery thereof and the second vehicle. In this case, the amount of power by which the first vehicle and the second vehicle are to be charged may be dynamically determined based on the battery charge level of each vehicle.

The electrically powered device 20 according to the embodiment may determine whether power relay to another vehicle is allowed, based on the battery charge level of the RESS 40. For example, when the battery charge level (or battery output voltage) of the first vehicle is greater than or equal to a predetermined reference value, the electrically powered device of the first vehicle may transmit the power received from the supply device 10 to the electrically powered device 20 of the second vehicle. On the other hand, when the battery charge level (or battery charge voltage) of the first vehicle is less than the predetermined reference value, the electrically powered device of the first vehicle may control the power received from the supply device not to be relayed to the electrically powered device of the second vehicle.

A vehicle terminal mounted on an electric vehicle may be connected to the supply device 10, another vehicle terminal, and/or a base stations, and/or a road side unit (RSU) through V2X (vehicle to everything) communication to exchange various kinds of information.

V2X refers to a communication technology for exchanging information with other vehicles, pedestrians, and infrastructure-built objects through wired/wireless communication. V2X may be divided into four types: vehicle-to-vehicle (V2V) for vehicle-to-vehicle communication; vehicle-to-infrastructure (V2I) for communication between a vehicle and infrastructure; vehicle-to-network (V2N) for communication between a vehicle and a communication network; and vehicle-to-pedestrian (V2P) for communication between a vehicle and a pedestrian. V2X communication may be provided via a PC5 interface and/or a Uu interface.

The electric vehicle according to the embodiment may communicate with the supply device 10 through V2X communication.

Sidelink (SL) is a communication scheme that establishes a direct wireless link between vehicle terminals to enable direct exchange of information between the vehicle terminals without intervention of a base station (BS) or infrastructure (for example, RSU). SL is considered as a way to alleviate the burden on the BS according to the rapidly increasing amount of data traffic and to minimize the transmission delay in vehicle-to-vehicle communication.

Figure 2:
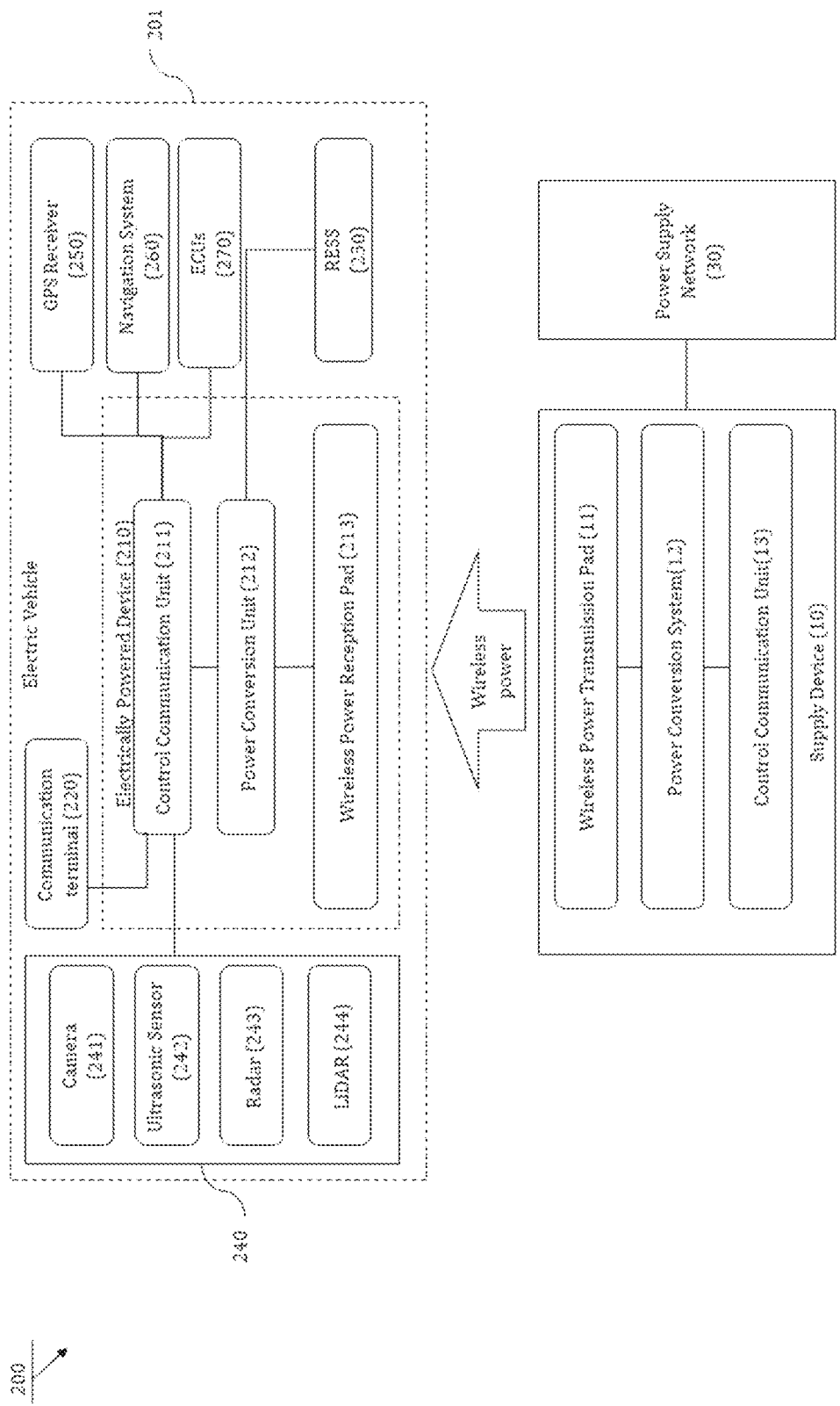
FIG. 2 is a diagram illustrating a detailed structure of an electric vehicle wireless charging system according to an embodiment.

FIG. 2 is a diagram illustrating the electric vehicle wireless charging system according to the embodiment.

Referring to FIG. 2, a wireless charging system 200 for an electric vehicle may include a supply device 10, a power supply network 30, and an electric vehicle 201.

In the embodiment of FIG. 2, wireless charging for one electric vehicle 201 is described as an example. However, this is merely an embodiment. There may be two or more electric vehicles 201 that may be charged simultaneously by the supply device 10. The maximum number of electric vehicles that may be charged simultaneously according to one supply device 10 may be dynamically determined by the maximum suppliable power of the supply device 10, the required power of the electric vehicles to be charged, and the like. The supply device 10 according to the embodiment may be provided with multiple wireless power transmission pads for wirelessly transmitting power to multiple electric vehicles.

The supply device 10 may include, but is not limited to, a wireless power transmission pad 11, a power conversion system 12, and a control communication unit 13. The supply device 10 may further include a positioning system (GPS) receiver (not shown) and an ultrasonic sensor (not shown).

The control communication unit 13 may control the overall operation and input/output of the supply device 10. Also, the control communication unit 13 may control the power conversion system 12 to convert power provided from the power supply network 30 into power required for charging of the electric vehicle 201. In this case, an AC power signal converted by the power conversion system 12 may be wirelessly transmitted through a transmission coil provided in the wireless power transmission pad 11. The wireless power generated through the wireless power transmission pad 11 as output may be induced in the reception coil of a wireless power reception pad 213 through electromagnetic induction (or electromagnetic resonance) and thus received by the electric vehicle 201.

In an embodiment, multiple wireless power transmission pads 11 may be provided in the supply device 10 so as to charge multiple electric vehicles simultaneously. However, this is merely one embodiment. Multiple transmission coils may be provided in one wireless power transmission pad 11 to charge multiple electric vehicles simultaneously.

The supply device 10 may further include a GPS receiver (not shown) and an ultrasonic sensor. The supply device 10 may provide the electric vehicle 201 with GPS coordinate information about the supply device 10 and offset information about the wireless power transmission pad 11. Here, the offset information may include information on the separation distance from the center line of the road on which the wireless power transmission pad 11 is mounted to the center line of the wireless power transmission pad 11. In addition, the supply device 10 may receive sensor state information related to the electric vehicle 201, and may adaptively drive the ultrasonic sensor based on the sensor state information related to the electric vehicle 201. In this case, the electric vehicle 201 may detect an ultrasonic signal generated by the supply device 10 as output and identify the location of the supply device 10 or the location of the wireless power transmission pad 11. Then, the electric vehicle 201 may move to the identified location and align the wireless power transmission and reception pads in place. Then, wireless charging may be performed.

Referring to FIG. 2, the electric vehicle 201 may include at least one of an electrically powered device 210, a communication terminal 220, a RESS 230, a sensor 240, a GPS receiver 250, a navigation system 260, or electric control units (ECUs) 270. Here, the sensor 240 may include at least one of a camera 241, an ultrasonic sensor 242, a radar 243, or a Light Detection and Ranging (LiDAR) 244. For example, the camera 241 may include at least one of a front camera, a rear camera, a left/right side camera, an upper camera, a lower camera, or a surround view monitor (SVM) camera. As an example, the camera 241 may further include at least one of an RGB camera and an infrared camera.

The electrically powered device 210 may include a control communication unit 211, a power conversion unit 212, and a wireless power reception pad 213.

The control communication unit 211 may control input/output and overall operation of the electrically powered device, and may perform communication with external device(s). As an example, the external devices may include the supply device 10 as well as devices mounted in the electric vehicle 201 such as, for example, the communication terminal 220, the sensor 240, the GPS receiver 250, the navigation system 260, and the ECUs 270.

The control communication unit 211 may communicate with various ECUs over an internal communication network of the electric vehicle 201. Here, the ECUs may include, but are not limited to, a steering system for steering control, a braking system for controlling stopping and parking, and a drive motor system for driving. The internal communication network of the electric vehicle 201 may include, but is not limited to, a controller area network (CAN), a local interconnect network (LIN), a FlexRay, and a media oriented systems transport (MOST) communication network.

The control communication unit 211 may exchange various kinds of control signals and state information with the control communication unit 13 of the supply device 10 through in-band (or out-of-band) communication for wireless power reception. Here, the in-band communication refers to a scheme of communication using the same frequency band as a frequency band used for wireless power transmission. As an example, the out-of-band communication may include, but is not limited to, IEEE 802.11p communication, 4G LTE communication, and 5G New Radio (NR) mmWave communication. According to the design by those skilled in the art, Bluetooth communication, radio frequency identification (RFID) communication, near field communication (NFC), infrared (IR)-dedicated short range communications (DSRC), or optical wireless communication (OWC) may be used.

Also, the control communication unit 211 may be directly/indirectly connected to a communication terminal of another electric vehicle via the communication terminal 220 to exchange information.

The supply device 10 may also be equipped with a separate communication terminal (not shown). In this case, the control communication unit 211 may exchange various kinds of control signals and state information with the communication terminal (not shown) of the supply device 10 via the communication terminal 220.

The control communication unit 211 may exchange various kinds of control signals and state information with a user device (including, for example, a smartphone and a smart key) via the communication terminal 220. To this end, the communication terminal 220 may be equipped with a Bluetooth communication function for communication with a smartphone and a frequency communication function for communication with a smart key. Here, the frequency communication function may include a function of receiving an RF radio wave of 433.92 MHz from the smart key and a function of transmitting a low frequency (LF) radio wave of 125 kHz to the smart key.

In addition, the control communication unit 211 may receive a predetermined control signal notifying the presence of a wireless power transmission pad in front of the vehicle from the navigation system 260 during driving. When the control communication unit 211 detects a wireless power transmission pad in front of the vehicle according to the control signal of the navigation system 260, it may perform a procedure of macroscopic alignment of the wireless power transmission and reception pad. Here, the macroscopic alignment procedure may include operations of estimation of a longitudinal position, control of a lateral position, fine lateral control, and fine longitudinal control. Each operation in the macroscopic alignment procedure will be specified through the description of the drawings given below.

The supply device 10 and the electrically powered device 210 of the electric vehicle 201 may transmit/receive various kinds of state information and control signals through wireless communication.

As an example, transmitter state information transmitted from the supply device 10 to the electrically powered device 210 of the electric vehicle 201 may include transmitter identification information, information about the maximum transmit power, information about the supportable power category, information about the maximum number of devices that can charged simultaneous, information about the types of supportable electrically powered devices, software version information, firmware version information, communication protocol version information, IP address information, MAC address information, port number information, and authentication and security information.

As an example, receiver state information transmitted from the electrically powered device 210 of the electric vehicle 201 to the supply device 10 may include, but is limited to, receiver identification information, information about required power, information about the maximum receivable power/voltage/current, and information about the battery charge level, information about the battery output voltage, software version information, firmware version information, communication protocol version information, IP address information, MAC address information, port number information, and authentication and security information. In an embodiment, the information about the battery charge level and the information about the battery output voltage may be exchanged between the electric vehicles 201 through communication between the communication terminals provided in the vehicles. However, this is merely one embodiment. In another embodiment, the information may be exchanged through communication between the electrically powered devices of the vehicles.

The control communication unit 211 may acquire information about the location of the supply device 10, that is, the location of the wireless power transmission pad 11, and/or information about the capability of the supply device 10 via the communication terminal 220.

In addition, the control communication unit 211 may acquire information about the location of other nearby electric vehicle(s) and information about the capability of the other nearby electric vehicle(s) via the communication terminal 220.

As an example, the capability information exchanged between electric vehicles may include, but is not limited to, information about whether a target electric vehicle is wirelessly chargeable, information about whether wireless charging between the electric vehicles is allowed, information about a mounting position of a wireless power transmission pad, and/or a wireless power reception pad, and/or a wireless power transmission/reception pad mounted on the target electric vehicle, information about a battery charge level, and information about whether wireless charging is in progress.

When the wireless power reception pad 213 of the electrically powered device 210 is aligned with the wireless power transmission pad 11 of the supply device 10, the control communication unit 13 of the supply device 10 may control the power conversion system 12 to convert the power supplied from the power supply network 30 into power required by the electric vehicle 201. Thereafter, the converted power may be induced in the wireless power reception pad 213 of the electric vehicle 201 through the wireless power transmission pad 11 in a manner of electromagnetic induction.

The electric vehicle 210 may estimate the distance to the wireless power transmission pad 11 based on sensing information received from the sensor 240 during driving. The electric vehicle 201 may perform a macroscopic alignment procedure by controlling the sensor 240 according to the distance to the wireless power transmission pad 11 estimated during driving.

Figure 3:
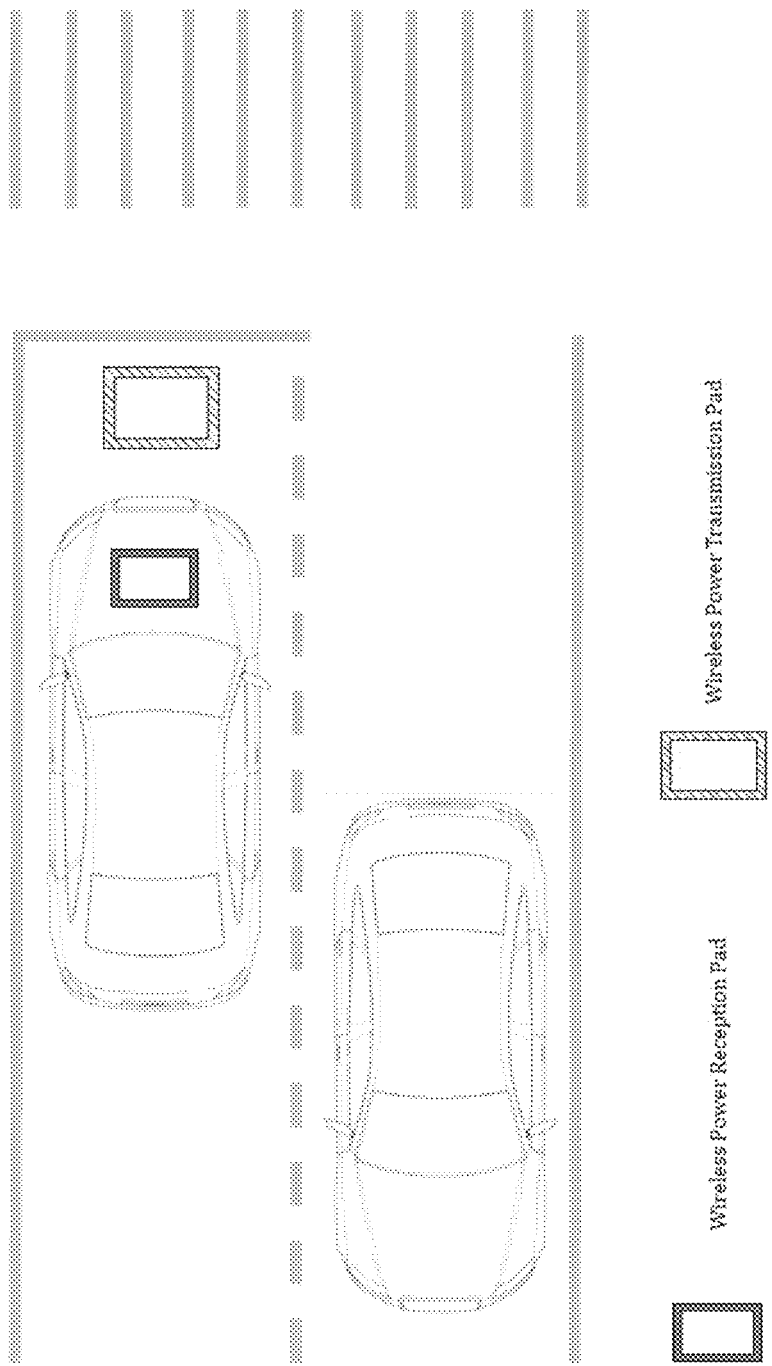
FIG. 3 is a diagram schematically illustrating a procedure of wireless charging during driving of an electric vehicle according to an embodiment.

FIG. 3 is a diagram schematically illustrating a procedure of wireless charging during driving of an electric vehicle according to an embodiment.

Specifically, FIG. 3 illustrates a procedure in which the electric vehicle aligns the wireless power reception pad mounted on the vehicle with the wireless power transmission pad mounted on the road surface before the stop line of, for example, an intersection and/or crosswalk, during driving, and then temporarily stops to perform wireless charging.

For example, the wireless power reception pad of the electric vehicle may be mounted on one side of the lateral center of the electric vehicle. However, this is merely one embodiment. The wireless power reception pad may be mounted to have a certain offset from the lateral center according to a design by those skilled in the art.

As an example, the wireless power transmission pad may be installed on the road surface at the lateral center of the corresponding driving lane so as to be spaced a predetermined distance from the stop line of, for example, an intersection and/or a crosswalk. However, this is merely one embodiment. The wireless power transmission pad may be installed to have a certain offset from the lateral center of the driving lane according to a design by those skilled in the art.

When the electric vehicle detects a wireless power transmission pad ahead of the vehicle during driving, it may perform lateral and longitudinal position control according to the estimated distance to the wireless power reception pad to position the wireless power reception pad of the vehicle on the wireless power transmission pad.

A detailed method of macroscopically aligning the wireless power transmission and reception pads in place while the electric vehicle is driving will become clearer through the description of the drawings given below.

The electric vehicle may detect the presence of a wireless power transmission pad in front of the vehicle based on information provided from a navigation system mounted therein. When the presence of the front wireless power transmission pad is detected, the electric vehicle may estimate the distance to the wireless power transmission pad using the sensor provided in the vehicle. As an example, the electric vehicle may estimate the distance to the wireless power transmission pad using at least one of GPS coordinate information about the wireless power transmission pad, which is acquired from the navigation system, the front camera, or the LiDAR.

The electric vehicle may sequentially drive the provided sensor(s) adaptively according to the remaining distance to the wireless power transmission pad during driving to align the wireless power transmission and reception pads at the correct position.

Figure 4:
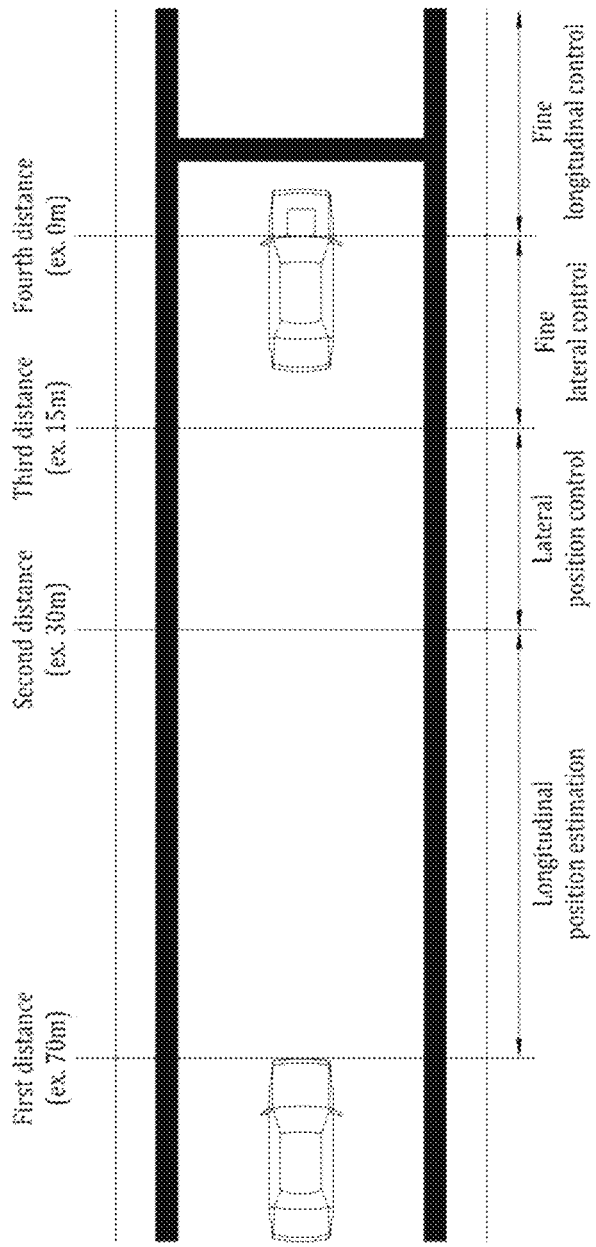
FIG. 4 is a diagram illustrating a macroscopic alignment procedure for wireless charging according to an embodiment.

FIG. 4 is a diagram illustrating a macroscopic alignment procedure for wireless charging according to an embodiment.

Referring to FIG. 4, when an electric vehicle detects the presence of a wireless power transmission pad in front of the vehicle based on the information provided by a navigation system during driving, the electric vehicle may estimate the remaining distance to the detected wireless power transmission pad, that is, the longitudinal position of the wireless power transmission pad by driving at least one of a LiDAR or a front camera provided therein.

For example, when the distance between the host vehicle and the wireless power transmission pad in front of the vehicle is within a first distance, the electric vehicle may detect the presence of the wireless power transmission pad according to a predetermined control signal from the navigation system. To this end, information about the mounting position of the wireless power transmission pad on the road may be pre-registered and displayed in the navigation map information. For example, the navigation system may dynamically determine the first distance based on the driving speed of the vehicle and/or the speed limit in the corresponding driving lane, but this is merely an example. The first distance may be preset to a fixed value according to a design by those skilled in the art. For example, the first distance may be set to a fixed value of 70 m.

The information about the mounting position of the wireless power transmission pad on the road provided by the navigation system according to the embodiment may include GPS coordinate information and/or information about a first offset indicating a perpendicular separation distance from the longitudinal center line of the driving road to the center of the wireless power transmission pad.

In an embodiment, the wireless power reception pad mounted in the electric vehicle may have a second offset from the lateral center of the vehicle according to the type of the vehicle.

The electric vehicle may initiate lateral position control based on the estimated longitudinal position being within a second distance. The electric vehicle may perform lateral position control in consideration of the first and second offsets described above.

When the electric vehicle is within the second distance, the electric vehicle may identify the left/right lanes using the lane cameras (e.g., left/right side-view cameras) provided therein, and determine a virtual center line of the current driving lane based on the information about the identified left/right lanes,. The electric vehicle may perform the lateral position control based on the determined virtual center line and the acquired first and/or second offset information.

In an embodiment, the second distance may be dynamically set based on the driving speed of the vehicle and/or the speed limit of the corresponding driving lane. However, this is merely one embodiment. The second distance may be preset to a fixed value. For example, the second distance may be set to a fixed value of 30 m.

When the distance to the wireless power transmission pad detected through the longitudinal position estimation is within a third distance, the electric vehicle may initiate fine lateral control. When the electric vehicle is within the third distance, it may recognize the wireless power transmission pad using the SVM camera provided therein. The electric vehicle may determine a virtual center line of the wireless power transmission pad based on the recognition result. Here, the virtual center line may include at least one of a lateral center line and a longitudinal center line.

The electric vehicle may perform the fine lateral control to maintain, on the same line, the virtual center line of the wireless power transmission pad recognized using the second offset information pre-stored according to the mounted wireless power reception pad and the second offset.

In an embodiment, the third distance may be dynamically set based on the driving speed of the vehicle and/or the speed limit of the corresponding driving lane. However, this is merely one embodiment. The third distance may be preset to a fixed value. For example, the third distance may be set to a fixed value of 15 m.

After the fine lateral control is completed, the electric vehicle may perform fine longitudinal control based on the distance from the front bumper of the vehicle to the wireless power transmission pad being within a fourth distance. As an example, the electric vehicle may make a request for transmission of wireless power to the supply device for the fine longitudinal control. The electric vehicle may calculate a wireless charging efficiency and/or measure a beam pattern based on the received wireless power, and perform the fine longitudinal control based on the calculated wireless charging efficiency and/or the measured beam pattern to optimally align the wireless power transmission and reception pads.

As an example, based on the wireless charging efficiency reaching a predetermined reference value, the electric vehicle may determine that the wireless power transmission and reception pads are aligned at the correct position.

As another example, the electric vehicle may monitor the induced current while moving forward slowly, and determine that the wireless power transmission and reception pads are aligned at the correct position at a point where the amount of the induced current becomes the peak value, namely, an inflection point.

As another example, the electric vehicle may determine that the wireless power transmission and reception pads are aligned at the correct position at a point where a beam pattern measured while the vehicle moves forward slowly matches a preset optimal beam pattern to a maximum degree.

As an example, the wireless power received from the supply device during fine longitudinal alignment may be lower than the power required to charge the battery.

In an embodiment, the fourth distance may be dynamically set based on the driving speed of the vehicle and/or the speed limit of the corresponding driving lane. However, this is merely one embodiment. The fourth distance may be preset to a fixed value. For example, the fourth distance may be set to a fixed value of 0 m.

When the fine longitudinal alignment is completed, the electric vehicle may perform wireless charging by making a request for wireless power necessary for battery charging to the supply device after stopping.

As an example, the electric vehicle may communicate with the supply device through V2X communication. However, this is merely one embodiment. An electric vehicle according to another example may communicate with the supply device through in-band communication.

The electric vehicle according to the embodiment may automatically reduce the driving speed step by step according to each operation in the macroscopic alignment procedure.

As an example, the vehicle driving speed may be decelerated step by step, following the stages of longitudinal position estimation, lateral position control, fine lateral control, and fine longitudinal control in this order. For example, the electric vehicle may automatically control the driving speed to 80% of a specified speed in the longitudinal position estimation stage, 40% of the specified speed in the lateral position control stage, 10% of the specified speed in the fine lateral control stage, and 3% of the specified speed in the fine longitudinal control stage.

The electric vehicle according to the embodiment may communicate with an intersection signal system. When the intersection signal is changed from a stop signal to a driving signal during the microscopic alignment procedure, the electric vehicle may control the step-by-step driving speed control not to be performed.

In an embodiment, the electric vehicle may control the driving speed not to decelerate when the intersection signal is not a stop signal as a result of the front camera analysis after the start of the microscopic alignment procedure.

The electric vehicle according to the embodiment may receive information about a traffic light timer from the intersection signal system. In this case, the electric vehicle may determine whether to perform the microscopic alignment procedure based on the information about the traffic light timer. As an example, when the wireless charging available time at the corresponding intersection or crosswalk calculated based on the information about the traffic light timer is less than or equal to a predetermined reference value, the electric vehicle may control the microscopic alignment procedure not to be performed.

Figure 5:
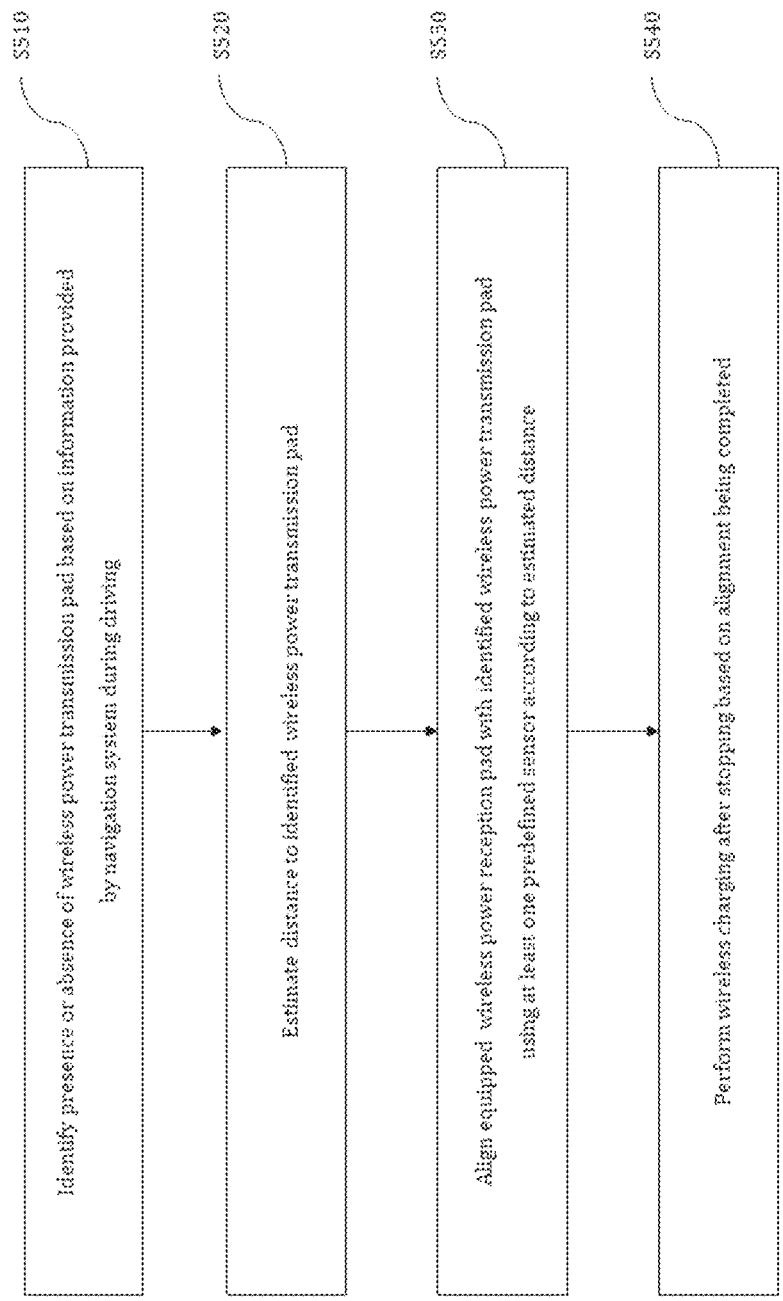
FIG. 5 is a flowchart illustrating a method for macroscopically aligning wireless power transmission and reception pads by an electric vehicle during driving according to an embodiment.

FIG. 5 is a flowchart illustrating a method for macroscopically aligning wireless power transmission and reception pads by an electric vehicle during driving according to an embodiment.

Referring to FIG. 5, the electric vehicle may identify (or determine) presence or absence of a wireless power transmission pad in front of the vehicle in a driving lane based on information provided by a navigation system (or a navigation system control signal) during driving (S510). As an example, the navigation system may transmit a predetermined control signal indicating the presence of the wireless power transmission pad in front of the vehicle to the electrically powered device based on the remaining driving distance from the electric vehicle to the wireless power transmission pad, which is estimated using the current GPS coordinates of the electric vehicle and the GPS coordinates of the wireless power transmission pad, is within a first distance. Thereafter, the electrically powered device may perform macroscopic alignment control in conjunction with the sensor(s) provided in the vehicle.

When the wireless power transmission pad is present in front of the vehicle in the driving lane, the electric vehicle may start estimating the distance to the identified wireless power transmission pad (S520). As an example, the distance to the wireless power transmission pad in front of the vehicle may be estimated based on at least one of the LiDAR, the front camera, or the information provided by the navigation system.

The electric vehicle may align the provided wireless power reception pad with the identified wireless power transmission pad using at least one predefined sensor according to the estimated distance (S530). As an example, the electric vehicle may sequentially perform lateral control and longitudinal control according to the estimated distance. Here, the lateral control may include lateral position control and fine lateral control.

As an example, the lateral position control may be performed based on an image from the front camera and offset information about the wireless power reception pad, and the fine lateral control may be performed based on an image from the SVM camera and the offset information about the wireless power reception pad. In this case, it is assumed that the wireless power transmission pad is installed at the center of the driving lane.

As another example, the lateral position control may be performed based on the image from the front camera, the offset information about the wireless power reception pad, and the offset information about the wireless power transmission pad, and the fine lateral control may be performed based on the image from the SVM camera image, the offset information about the wireless power reception pad, and the offset information about the wireless power transmission pad. In this case, the wireless power transmission pad may be installed to be spaced apart a predetermined distance from the center of the driving lane.

As an example, in the longitudinal control, fine alignment may be performed between the wireless power transmission and reception pads based on the calculated wireless charging efficiency, and/or the measured beam pattern, and/or the measured amount of induced current corresponding to the wireless power received via the wireless power reception pad.

The electric vehicle may perform wireless charging after stopping based on the fine longitudinal alignment being completed (S540).

In an embodiment, the magnitude of wireless power received in the fine longitudinal alignment may be less than the magnitude of the wireless power received in actual wireless charging after completion of the fine longitudinal alignment. To this end, when the fine longitudinal alignment is completed, the electric vehicle may transmit a predetermined control signal to the supply device to request wireless power necessary for charging the battery. As an example, the electric vehicle may make a request for transmission of a specific level of wireless power to the supply device through V2X communication according to the alignment state of the wireless power transmission and reception pads.

Figure 6:
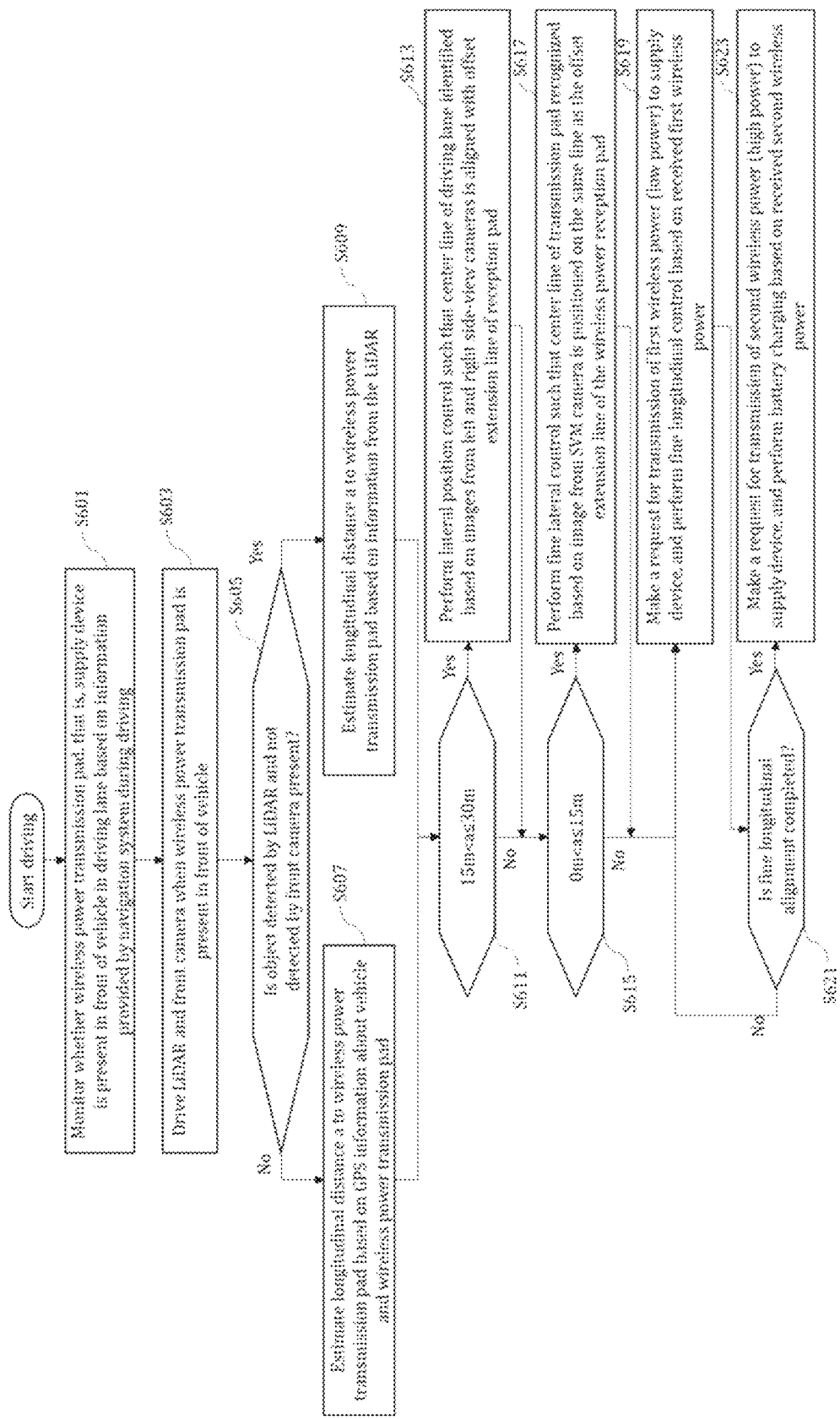
FIG. 6 is a flowchart illustrating a method for macroscopically aligning wireless power transmission and reception pads by an electric vehicle during driving according to another embodiment.

FIG. 6 is a flowchart illustrating a method for macroscopically aligning wireless power transmission and reception pads by an electric vehicle during driving according to another embodiment.

Referring to FIG. 6, the electric vehicle may monitor whether a wireless power transmission pad, that is, a supply device is present in front of the vehicle in a driving lane based on information provided by the navigation system during driving (S601).

When a wireless power transmission pad is present in front of the vehicle as a result of the monitoring, the electric vehicle may drive the LiDAR and the front camera provided therein (S603).

The electric vehicle may determine whether an object detected by the LiDAR and undetected by the front camera is present (S605).

When the object is not present, for example, the object is undetected by either the LiDAR or the front camera as a result of the determination, the electric vehicle may estimate the longitudinal distance a to the wireless power transmission pad based on the GPS information about the vehicle and the wireless power transmission pad (S607). Here, the GPS information about the vehicle and the wireless power transmission pad may be information provided by the navigation system.

When the object detected by the LiDAR and undetected by the front camera is present as a result of the determination in operation S605, the electric vehicle may estimate the longitudinal distance a to the wireless power transmission pad based on information from the LiDAR (S609).

When the estimated longitudinal distance is greater than a first distance and less than or equal to a second distance, the electric vehicle may drive the left and right side-view cameras, and perform lateral position control such that the center line of the identified driving lane based on images from the left and right side-view cameras is aligned with an offset extension line of the wireless power reception pad (S611 to S613). In this case, the electric vehicle assumes that the wireless power transmission pad is located at the center of the driving lane. As an example, the first distance may be 15 m and the second distance may be 30 m. However, this is merely one embodiment. The first distance and the second distance may be dynamically determined based on vehicle driving speed information and speed limit information about the driving lane.

When the estimated longitudinal distance is greater than a third distance and less than or equal to the first distance, the electric vehicle may drive the SVM camera, and perform fine lateral control such that the center line of the wireless power transmission pad actually recognized based on an image from the SVM camera is positioned on the same line as the offset extension line of the wireless power reception pad (S615 to S617). As an example, the third distance may be 0 m. However, this is merely one embodiment. The third distance may be dynamically determined based on driving speed information about the vehicle, speed limit information about the driving lane, a reference point of the electric vehicle for distance calculation, and a mounting position of the wireless power reception pad.

When the estimated longitudinal distance is within the third distance, the electric vehicle may make a request for transmission of a first wireless power (low power) to the supply device, and perform fine longitudinal control based on the received first wireless power (S619).

When the fine longitudinal alignment is completed, the electric vehicle may make a request for transmission of a second wireless power (high power) to the supply device, and perform battery charging based on the received second wireless power (S621 to S623).

Figure 7:
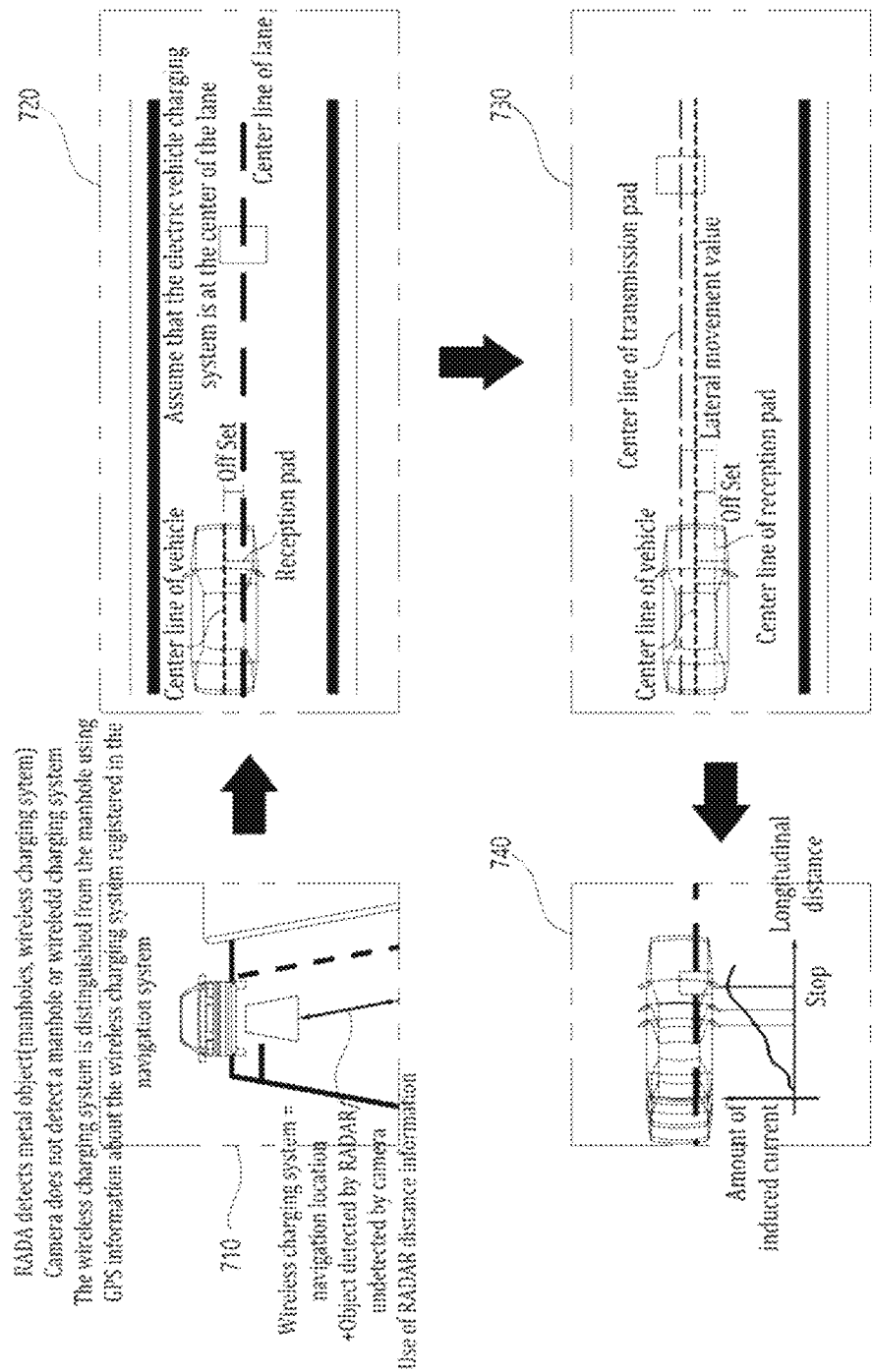
FIG. 7 specifically illustrates a macroscopic alignment procedure for wireless charging of the electric vehicle according to an embodiment.

FIG. 7 specifically illustrates a macroscopic alignment procedure for wireless charging of the electric vehicle according to an embodiment.

As shown in the part assigned reference number 710 in FIG. 7, an electric vehicle may generally detect a metal object, such as a manhole or a wireless power transmission pad, from a relatively long distance using LiDAR. However, it is difficult to detect the object located at a long distance through the camera. Accordingly, the electric vehicle may effectively distinguish an object detected through the LiDAR (e.g., a manhole and a wireless power transmission pad) based on the GPS information about the wireless power transmission pad registered in the navigation system, that is, the supply device. In addition, based on the GPS information about the wireless power transmission pad registered in the navigation system and the GPS information about the vehicle, the electric vehicle may estimate the longitudinal distance between the vehicle and the wireless power transmission pad.

Since it is difficult for an electric vehicle to check the exact location of the wireless power transmission pad through the front camera, LiDAR, GPS information, etc., it is first assumed that the wireless power transmission pad is located at the center of the driving lane, as shown in the part 720. Then, the lateral position control may be performed such that the center line of the wireless power reception pad corresponding to the offset of the wireless power reception pad is aligned with the center line of the driving lane.

As shown in the part 730, the electric vehicle may recognize an actual wireless power transmission pad based on an image from the SVM camera or a smart parking assistance system (SPAS) sensor, and identify the center line of the wireless power transmission pad based on the result of the recognition. The electric vehicle may determine a lateral movement value based on the center line of the identified wireless power transmission pad, and may perform lateral fine alignment by slowly moving according to the determined lateral movement value.

When the fine lateral alignment is completed, the electric vehicle may perform fine longitudinal alignment. Referring to the part 740, the electric vehicle may make a request for transmission of wireless power to the supply device for the fine longitudinal alignment. The electric vehicle may determine a stop position based on a change in the amount of induced current corresponding to the received wireless power. As an example, the electric vehicle may determine a point where there is an inflection point of the amount of induced current as the stop position. As another example, the electric vehicle may calculate wireless charging efficiency based on the received wireless power, and determine a point where the calculated wireless charging efficiency is maximized as the stop position. As another example, the electric vehicle may measure a beam pattern corresponding to the received wireless power, and compare the measured beam pattern with a predefined optimal beam pattern. The electric vehicle may determine a point where the similarity of the two beam patterns exceeds a predetermined reference value as the stop position for wireless charging.

While performing the fine longitudinal control during decelerated driving, the electric vehicle according to the embodiment may communicate with the supply device through V2X communication to perform wireless charging. After the electric vehicle stops according to completion of the fine longitudinal alignment, it may communicate with the supply device through in-band communication to perform wireless charging.

In another embodiment, while performing the fine longitudinal control during decelerated driving, the electric vehicle may communicate with the supply device through V2X communication. After the electric vehicle stops according to completion of the fine longitudinal alignment, it may communicate with the supply device through short-distance wireless communication (e.g., Bluetooth communication) to perform wireless charging.

Figure 8:
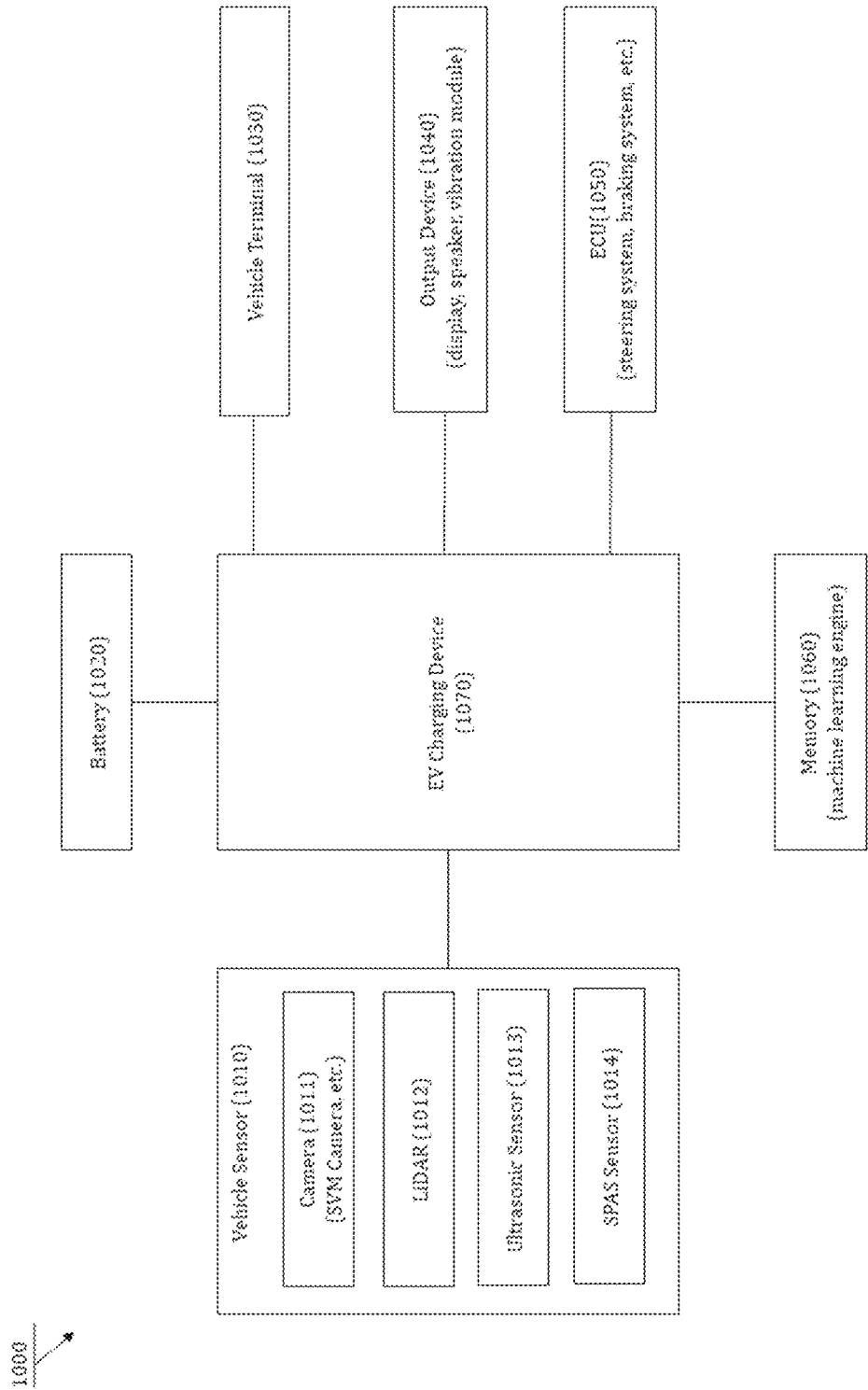
FIG. 8 is a block diagram illustrating a configuration of an electric vehicle according to an embodiment.

FIG. 8 is a block diagram illustrating a configuration of an electric vehicle according to an embodiment.

Referring to FIG. 8, an electric vehicle 1000 may include a vehicle sensor 1010, a battery 1020, a vehicle terminal 1030, an output device 1040, an electronic control unit (ECU) 1050, a memory 1060, and a electrically powered device 1070.

The vehicle sensor 1010 may include, but is not limited to, at least one of a camera 1011, a LiDAR 1012, an ultrasonic sensor 1013, or an SPAS sensor 1014. It may further include radar. According to an embodiment, the camera 1011 may include an SVM camera. The SVM camera may include a front camera, a left/right side-view camera, and a rear camera.

The vehicle sensor 1010, the vehicle terminal 1030, the output device 1040, and the ECU 1050 may be connected to the electrically powered device 1070 over an in-vehicle communication network. Here, the in-vehicle communication network may include, but is not limited to, a controller area network (CAN), a local interconnect network (LIN), a FlexRay, and a media oriented systems transport (MOST) communication network.

The vehicle terminal 1030 may include a mobile communication module for wireless communication with an external device, a GPS module to receive a GPS signal, and a navigation system module to provide a navigation service.

The electrically powered device 1070 may perform a macroscopic alignment control operation for wireless charging during driving. For example, when a wireless power transmission pad is present in front of the vehicle, the electrically powered device 1070 may estimate the distance to the wireless power transmission pad using the provided sensors. Then, it may adaptively drive the sensors according to the estimated distance and perform lateral alignment and longitudinal alignment, thereby aligning the wireless power transmission and reception pads at the correct position.

For the detailed operation of the electrically powered device 1070 for microscopic alignment, refer to the description of the drawings given above.

When the alignment of the wireless power transmission and reception pads is completed, the electrically powered device 1070 may receive wireless power through negotiation with the supply device and charge the battery 1020 in the vehicle.

The memory 1060 may maintain various learning models and learning engines for sensor information-based machine learning, and in particular, may maintain offset information about the wireless power reception pad mounted on the electric vehicle 1000. Here, the offset information may be set to a left (+)/right (−) offset value with respect to the center line of the electric vehicle in units of cm or mm.

The electrically powered device described in relation to the embodiments disclosed in the present disclosure may include at least one transceiver configured to transmit and receive signals to and from a vehicle display, a vehicle terminal and various ECUs connected over the in-vehicle communication network, external network equipment connected over an external wired/wireless communication network, and an electrically powered device of another vehicle, and a user device, at least one processor connected to the at least one transceiver to control the overall operation, and a memory having a program recorded thereon for an operation of the at least one processor.

The supply device described in relation to the embodiments disclosed in the present disclosure may include a first transceiver configured to transmit and receive signals to and from the electrically powered device through in-band (or out-of-band) communication, and receives power from the power supply network, a second transceiver configured to receive power from a power supply network and transmit and receive various kinds of control signals to and from the power supply network, at least one processor connected to the first and second transceivers to control the overall operation, and a memory having a program recorded thereon for the operation of the processor.

Steps in a method or algorithm described in relation to the embodiments disclosed herein may be directly implemented in hardware, a software module, or a combination of the two, executed by a processor. The software module may reside in a storage medium (i.e., a memory and/or storage) such as a RAM, a flash memory, a ROM, an EPROM, an EEPROM, a registers, a hard disk, a removable disk, or a CD-ROM.

An exemplary storage medium may be coupled to the processor, the processor may read information from, and write information to, the storage medium. Alternatively, the storage medium may be integrated with the processor. The processor and storage medium may reside within an application specific integrated circuit (ASIC). The ASIC may reside within the user terminal. Alternatively, the processor and storage medium may reside as separate components within the user terminal.

The above description is merely illustrative of the technical spirit of the present disclosure. It will be apparent to those skilled in the art that various modifications and variations can be made in the present disclosure without departing from the spirit and scope of the disclosure.

Therefore, the embodiments disclosed in the present disclosure are merely illustrative of the technical spirit of the present disclosure. The scope of the technical spirit of the present disclosure is not limited by these embodiments. The scope of the present disclosure should be construed by the appended claims, and all technical ideas within the scope equivalent thereto should be construed as being within the scope of the present disclosure.

What is claimed is:

1. An alignment method for wireless charging of an electric vehicle, the method comprising:
    identifying presence of a wireless power transmission pad during driving;
    estimating a distance to the wireless power transmission pad;
    performing a macroscopic alignment procedure according to the distance; and
    performing wireless charging based on the macroscopic alignment procedure being completed,
    wherein the macroscopic alignment procedure includes sequentially performing longitudinal position estimation at a first distance to the wireless power transmission pad, performing lateral position control at a second distance, shorter than the first distance, to the wireless power transmission pad, performing fine lateral control at a third distance, shorter than the second distance, to the wireless power transmission pad, and performing fine longitudinal control at a fourth distance, shorter than the third distance, to the wireless power transmission pad, and wherein the second distance and the third distance are dynamically set based on a driving speed of the vehicle and/or a speed limit of a driving lane of the vehicle.

2. The method of claim 1, wherein location information related to the wireless power transmission pad is pre-registered in a navigation system,
wherein the presence of the wireless power transmission pad is identified based on the location information provided by the navigation system.

3. The method of claim 2, wherein estimating the distance to the wireless power transmission pad comprises:
driving a Light Detection and Ranging (LiDAR) and a front camera disposed in the electric vehicle based on the presence of the wireless power transmission pad in a driving lane in front of the electric vehicle;
determining whether an object detected by the LiDAR and undetected by the front camera is present; and
estimating a longitudinal distance to the wireless power transmission pad based on one of the location information provided by the navigation system or information from the LiDAR.

4. The method of claim 3, wherein, based on the object detected by the LiDAR and undetected by the front camera being present, the longitudinal distance is estimated based on the information from the LiDAR, and
wherein, based on the object detected by the LiDAR and undetected by the front camera not being present, the longitudinal distance is estimated based on global positioning system (GPS) information about the electric vehicle and the wireless power transmission pad.

5. The method of claim 4, wherein the GPS information about the wireless power transmission pad is pre-registered and maintained in the navigation system, and
wherein, based on the electric vehicle being positioned within a specific distance from the wireless power transmission pad in front of the electric vehicle, the GPS information about the electric vehicle and the wireless power transmission pad is provided by the navigation system.

6. The method of claim 1, wherein performing the lateral position control comprises:
performing lateral position control based on a first offset indicating a perpendicular separation distance from a longitudinal center line of a driving road to a center of the wireless power transmission pad and a second offset from a wireless power reception pad mounted in the electric vehicle and a lateral center of the electric vehicle.

7. The method of claim 1, wherein performing the lateral control comprises:
based on the distance to the wireless power transmission pad being within the second distance, performing the lateral position control such that a center line of a driving lane identified based on an image from a side-view camera is positioned on a same line as an offset extension line of a wireless power reception pad mounted on the electric vehicle; and
based on the distance to the wireless power transmission pad being within the third distance, performing the fine lateral control such that a center line of the wireless power transmission pad recognized based on an image from a surround view monitor (SVM) camera is positioned on the same line as the offset extension line of the wireless power reception pad,
wherein the first distance is larger than the second distance.

8. The method of claim 7, wherein performing the fine longitudinal control comprises:
based on the distance to the wireless power transmission pad being within the fourth distance, making a request for transmission of a first wireless power to a supply device corresponding to the wireless power transmission pad;
receiving the first wireless power via the wireless power reception pad; and
performing the fine longitudinal control based on the first wireless power.

9. The method of claim 8, wherein performing the fine longitudinal control comprises:
decelerating driving;
measuring an amount of induced power corresponding to the first wireless power during the decelerated driving;
detecting an inflection point of the amount of the induced power; and
stopping the electric vehicle at a point where the inflection point is detected.

10. The method of claim 9, wherein performing the wireless charging comprises:
based on the fine longitudinal control being completed, making a request for transmission of a second wireless power to the supply device;
receiving the second wireless power via the wireless power reception pad; and
charging a battery using the second wireless power.

11. The method of claim 10, wherein a magnitude of the second wireless power is greater than a magnitude of the first wireless power,
wherein the first wireless power is requested through Vehicle to Everything (V2X) communication; and
wherein the second wireless power is requested through in-band communication or short-range wireless communication.

12. The method of claim 8, wherein performing the fine longitudinal control comprises:
decelerating driving;
calculating a wireless charging efficiency corresponding to the first wireless power during the decelerated driving;
detecting a time at which the wireless charging efficiency exceeds a reference value; and
stopping the electric vehicle at the time at which the wireless charging efficiency exceeds the reference value.

13. The method of claim 8, wherein performing the fine longitudinal control comprises:
decelerating driving;
measuring a beam pattern corresponding to the first wireless power during the decelerated driving;
determining a stop time point by comparing the measured beam pattern with an optimal beam pattern; and
stopping the electric vehicle according to the stop time point.

14. A non-volatile computer-readable storage medium storing at least one computer program including instructions that, when executed by at least one processor, cause an electric vehicle provided with the at least one processor to perform alignment operations for wireless charging, the operations comprising:
identifying presence of a wireless power transmission pad during driving;
estimating a distance to the wireless power transmission pad;

performing a macroscopic alignment procedure according to the distance; and performing wireless charging based on the macroscopic alignment procedure being completed, wherein the macroscopic alignment procedure includes sequentially performing longitudinal position estimation at a first distance to the wireless power transmission pad, performing lateral position control at a second distance, shorter than the first distance, to the wireless power transmission pad, performing fine lateral control at a third distance, shorter than the second distance, to the wireless power transmission pad, and performing fine longitudinal control at a fourth distance, shorter than the third distance, to the wireless power transmission pad, and wherein the second distance and the third distance are dynamically set based on a driving speed of the vehicle and/or a speed limit of a driving lane of the vehicle.

15. An electric vehicle equipped with a wireless charging function, comprising:

a vehicle terminal configured to communicate with an external device;

a vehicle sensor configured to provide at least one piece of sensing information necessary for alignment of a wireless power transmission pad and a wireless power reception pad; and an electrically powered device configured to operate in conjunction with the vehicle terminal and the vehicle sensor to:

identify presence of the wireless power transmission pad during driving;

estimate a distance to the wireless power transmission pad;

perform a macroscopic alignment procedure according to the distance; and perform wireless charging based on the macroscopic alignment procedure being completed, wherein the macroscopic alignment procedure includes sequentially performing longitudinal position estimation at a first distance to the wireless power transmission pad, performing lateral position control at a second distance, shorter than the first distance, to the wireless power transmission pad, performing fine lateral control at a third distance, shorter than the second distance, to the wireless power transmission pad, and performing fine longitudinal control at a fourth distance, shorter than the third distance, to the wireless power transmission pad, and wherein the second distance and the third distance are dynamically set based on a driving speed of the vehicle and/or a speed limit of a driving lane of the vehicle.

16. The electric vehicle of claim 15, wherein the vehicle terminal provides information of a navigation system, wherein location information about the wireless power transmission pad is pre-registered in the navigation system, and wherein the presence of the wireless powered transmission pad is identified based on the location information provided by the navigation system.

17. The electric vehicle of claim 16, wherein the vehicle sensor comprises a Light Detection and Ranging (LiDAR) and a front camera, wherein the electrically powered device is configured to:

drive the LiDAR and the front camera based on the presence of the wireless power transmission pad in a driving lane in front of the electric vehicle;

determine whether an object detected by the LiDAR and undetected by the front camera is present; and estimate a longitudinal distance to the wireless power transmission pad based on one of the location information provided by the navigation system or information from the LiDAR.

18. The electric vehicle of claim 17, wherein, based on the object detected by the LiDAR and undetected by the front camera being present, the electrically powered device estimates the longitudinal distance based on the information from the LiDAR, wherein, based on the object detected by the LiDAR and undetected by the front camera not being present, the electrically powered device estimates the longitudinal distance based on global positioning system (GPS) information about the electric vehicle and the wireless power transmission pad included in the location information provided by the navigation system.

19. The electric vehicle of claim 18, wherein the GPS information about the wireless power transmission pad is pre-registered and maintained in the navigation system, wherein, based on the electric vehicle being positioned within a specific distance from the wireless power transmission pad in front of the electric vehicle, the GPS information about the electric vehicle and the wireless power transmission pad is provided by the navigation system.

20. The electric vehicle of claim 15, wherein performing the lateral position control comprises performing lateral position control based on a first offset indicating a perpendicular separation distance from a longitudinal center line of a driving road to a center of the wireless power transmission pad and a second offset from a wireless power reception pad mounted in the electric vehicle and a lateral center of the electric vehicle.

* * * * *